May 23, 1933.   J. H. TAYLOR   1,910,652
APPARATUS FOR MAKING EXPANSION JOINTS IN PIPES
Filed June 23, 1930
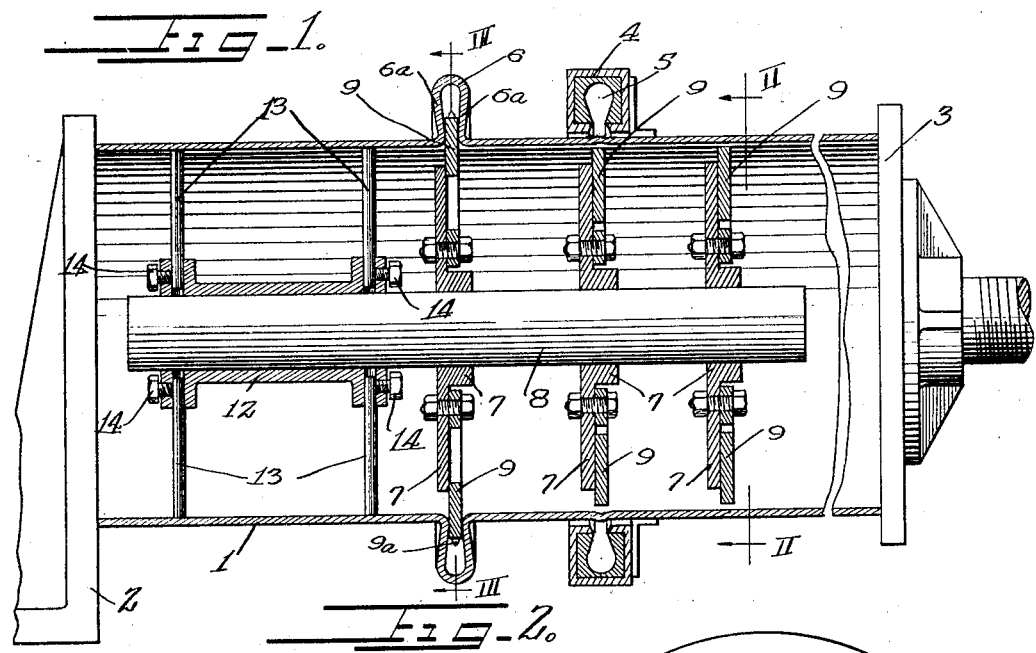
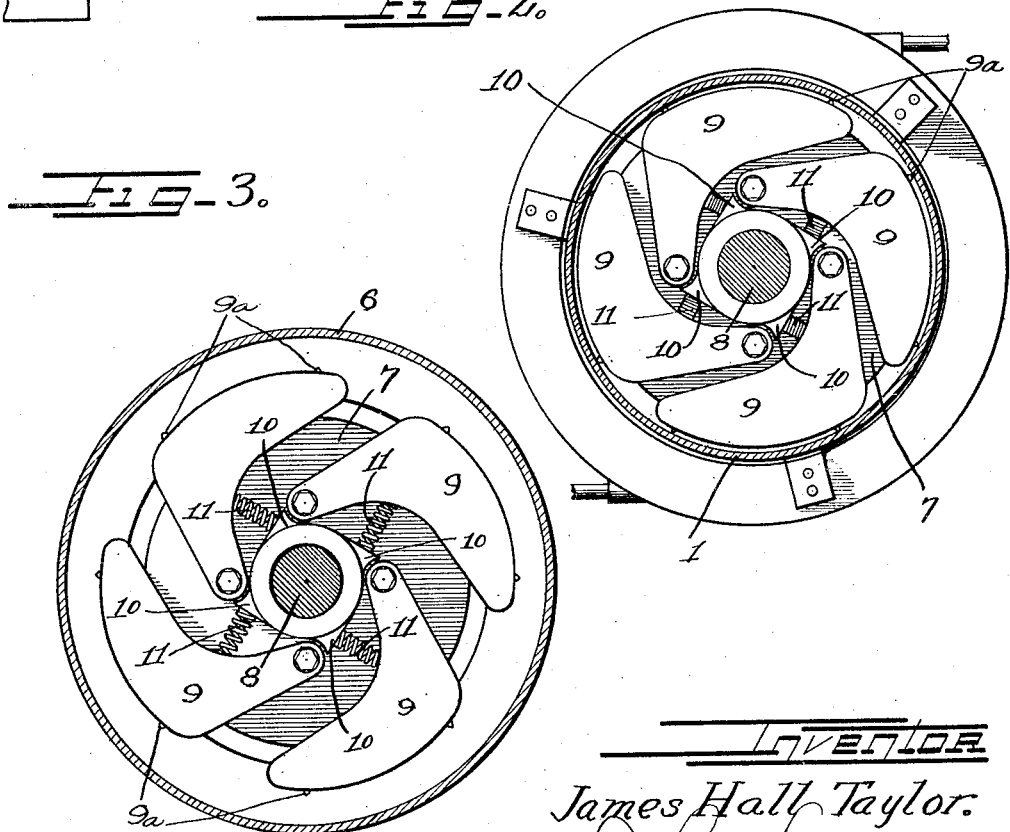
Inventor
James Hall Taylor.

Patented May 23, 1933

1,910,652

UNITED STATES PATENT OFFICE

JAMES HALL TAYLOR, OF OAK PARK, ILLINOIS

APPARATUS FOR MAKING EXPANSION JOINTS IN PIPES

Application filed June 23, 1930. Serial No. 462,983.

This invention relates to a method and apparatus for making expansion joints in pipes, and concerns itself with a novel method and apparatus whereby the pipe is longitudinally compressed to bulge outwardly an annular heated section, the walls of which are maintained in seperated relation.

The invention comprises the novel method and apparatus hereinafter described and more particularly pointed out and defined in the appended claims.

In the accompanying drawing, which illustrates a preferred form of this invention and in which similar reference numerals refer to similar features in the different views:

Figure 1 is a sectional view taken longitudinally through a pipe in connection with the apparatus involving this invention, Figure 2 is a sectional view upon the line II—II of Figure 1, and Figure 3 is a sectional view upon the line III—III of Figure 1.

According to this invention, an annular section of the pipe where the expansion joint is desired is heated, and the pipe is compressed in a longitudinal direction to cause the annular heated portion to bulge outwardly. As the heated portion bulges outwardly and the walls tend to approach each other, due to the compression force, suitable segments automatically enter the bulged part and maintain the walls of the bulged part in proper separated relation. This method of forming expansion joints may be carried out in various forms of apparatuses, one form of which is illustrated and will now be described.

In the drawing, there is shown a pipe 1, the rear end of which contacts an abutment 2. A pressure head 3 is shown acting against the forward end of the pipe. Surrounding the pipe there is a movable heating device 4 having an annular pear-shaped recess 5 into which the heated section of the pipe is bulged as it is compressed by the head 3 to produce an annular rib 6 commonly termed an expansion joint. It will be evident that the thrust of the pressure head will tend to collapse the expansion joint or, in other words, bring the two walls 6a thereof together.

In order to prevent the collapsing of the expansion joint during the formation thereof, automatic means are provided for moving into the joint as it is being formed and keeping the walls thereof suitably separated. While this means may assume various forms, as a matter of illustration I have shown a plurality of spiders 7 secured upon a supporting mandrel 8 within the pipe and a plurality of automatically operated metal segments 9 pivoted upon each spider. These segments are preferably provided with teats 9a to prevent the total surface thereof from coming into contact with the heated section and becoming too hot. Each spider 7 is provided with a plurality of seats 10 corresponding to the number of segments 9 and so located as to support springs 11 for bearing against intermediate points of the segments 9 and upon the bottom thereof.

The mandrel 8 is supported in a sleeve 12 which is properly positioned within the pipe by means of adjustable rods 13. The outer ends of these rods bear against the pipe, while the inner ends are adjustably mounted in suitable sockets in the sleeve and retained by set-screws 14.

The spiders are adapted to be positioned in the plane of formation of an expansion joint, and, as the pipe sheet is bulged outwardly by the compression caused by the head 3, the springs 11 will automatically force the segments 9, which normally bear against the interior surface of the pipe, outwardly into the bulge as it is formed and between the walls thereof, thereby preventing the walls from being collapsed or brought together, as shown in Figure 1.

From the foregoing it will be appreciated that a novel form of apparatus has been provided which automatically acts as an expansion joint is being formed to maintain the walls thereof in proper spaced relation.

I am aware that many changes may be made and numerous details of construction may be varied through a wide range without departing from the principles of this invention, and I therefore do not desire to be limited in the patent granted hereon otherwise than necessitated by the prior art.

I claim as my invention:

1. In an apparatus for forming an expansion joint in a pipe, means to heat an annular section of the pipe, means to compress the pipe longitudinally to outwardly bulge the heated section, a movable metal member within the pipe, and means for automatically moving said member into the expansion joint as it is formed.

2. The combination with means for forming an expansion joint in a pipe, of a plurality of metal members within the pipe, and means for automatically moving said members into the expansion joint during the formation thereof.

3. The combination with means for forming an expansion joint in a pipe, of a support within said pipe, movable members mounted upon said support, and means for moving said members into the joint during the formation thereof.

4. The combination with means for forming an expansion joint in a pipe, of a mandrel within said pipe, a spider upon said mandrel, a plurality of segments pivoted upon said spider, and yielding means for urging said segments against the interior wall of said pipe for the purpose set forth.

5. In an apparatus for forming an expansion joint in a pipe, an abutment for one end of the pipe, a pressure head for the other end of the pipe, means for heating an annular section, and automatically movable metal members within the pipe adapted for moving between the walls of the expansion joint as it is being formed.

In testimony whereof I have hereunto subscribed my name at Chicago, Cook County, Illinois.

JAMES HALL TAYLOR.